(12) United States Patent
Artman et al.

(10) Patent No.: US 10,853,089 B2
(45) Date of Patent: Dec. 1, 2020

(54) DYNAMICALLY LOADING FIRMWARE BASED ON GEOGRAPHIC LOCATION

(71) Applicant: LENOVO Enterprise Solutions (Singapore) PTE. LTD., New Tech Park (SG)

(72) Inventors: Paul Artman, Cary, NC (US); Gary D. Cudak, Wake Forest, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 113 days.

(21) Appl. No.: 15/084,846

(22) Filed: Mar. 30, 2016

(65) Prior Publication Data

US 2017/0286126 A1    Oct. 5, 2017

(51) Int. Cl.
*G06F 9/44* (2018.01)
*G06F 9/4401* (2018.01)

(52) U.S. Cl.
CPC .......... *G06F 9/4411* (2013.01); *G06F 9/4416* (2013.01)

(58) Field of Classification Search
CPC .. H04L 41/0856; H04L 41/085; G06F 9/4411; G06F 9/44505
See application file for complete search history.

(56) References Cited

U.S. PATENT DOCUMENTS

| | | | | |
|---|---|---|---|---|
| 7,246,221 B1 * | 7/2007 | Soltis | ..................... | G06F 9/4416 709/219 |
| 7,506,366 B1 * | 3/2009 | Sze | ......................... | G06F 21/35 726/5 |
| 2003/0212684 A1 * | 11/2003 | Meyer | ..................... | H04L 41/082 |
| 2006/0294199 A1 * | 12/2006 | Bertholf | ............... | G06F 16/972 709/217 |
| 2007/0169097 A1 | 7/2007 | Al Saadi et al. | | |
| 2007/0226477 A1 * | 9/2007 | Haban | ...................... | G06F 8/60 713/1 |
| 2007/0237096 A1 * | 10/2007 | Vengroff | ............... | H04W 4/029 370/254 |
| 2008/0019317 A1 * | 1/2008 | Vellanki | ............ | H04M 1/72572 370/331 |
| 2008/0168463 A1 | 7/2008 | Donohue et al. | | |
| 2009/0036148 A1 * | 2/2009 | Yach | .................... | G06Q 10/109 455/457 |
| 2009/0129291 A1 * | 5/2009 | Gupta | ..................... | H04W 8/26 370/254 |
| 2011/0138024 A1 * | 6/2011 | Chen | ...................... | G06Q 20/10 709/220 |

(Continued)

OTHER PUBLICATIONS

U.S. Appl. No. 15/084,861, filed Mar. 30, 2016, Office Action dated May 4, 2017.

*Primary Examiner* — Phil K Nguyen
(74) *Attorney, Agent, or Firm* — Kunzler Bean & Adamson; Bruce R. Needham

(57) ABSTRACT

Apparatuses, methods, systems, and program products are disclosed for dynamically loading firmware based on geographic location. A location module determines a geographic location associated with a system. A firmware module determines a firmware configuration associated with the geographic location. A loading module dynamically accesses the firmware configuration associated with the geographic location from a remote data store, and loads the firmware configuration on the system.

19 Claims, 9 Drawing Sheets

(56) References Cited

U.S. PATENT DOCUMENTS

| | | | |
|---|---|---|---|
| 2011/0225640 A1 | 9/2011 | Ganapathy et al. | |
| 2012/0284322 A1* | 11/2012 | Laborczfalvi | H04W 4/021 709/202 |
| 2013/0019089 A1* | 1/2013 | Guidotti | G06F 9/5072 713/100 |
| 2013/0138783 A1 | 5/2013 | Mallur et al. | |
| 2013/0185548 A1* | 7/2013 | Djabarov | G06F 21/602 713/2 |
| 2013/0328917 A1 | 12/2013 | Zambetti et al. | |
| 2013/0347058 A1* | 12/2013 | Smith | G06F 21/57 726/1 |
| 2014/0025878 A1* | 1/2014 | Peng | G06F 8/654 711/104 |
| 2014/0052974 A1* | 2/2014 | Masters | G01S 5/0027 713/1 |
| 2016/0092261 A1 | 3/2016 | Li et al. | |
| 2016/0147996 A1* | 5/2016 | Martinez | G06F 21/572 713/2 |
| 2016/0179265 A1* | 6/2016 | Zeng | G06F 3/0416 345/173 |
| 2016/0378990 A1* | 12/2016 | Goodman | G06F 21/572 726/19 |
| 2017/0109176 A1* | 4/2017 | Shih | G06F 9/4416 |
| 2017/0249155 A1* | 8/2017 | Sundrani | G06F 9/4401 |

* cited by examiner

DYNAMICALLY LOADING FIRMWARE BASED ON GEOGRAPHIC LOCATION

FIELD OF THE INVENTION

The subject matter disclosed herein relates to loading firmware on a device and more particularly relates to accessing firmware from a remote device based on a geographic location.

BACKGROUND

Computer devices may include a number of different component devices such as processors, memory, storage drives, network cards, graphics cards, and/or the like. Many of these component devices are controlled using firmware that is conventionally stored in non-volatile memory devices associated with the component devices. Because the firmware is stored in a non-volatile memory device, the firmware for a component device is rarely if ever changed. Even if firmware is changed during the lifetime of the component device, it can be difficult and time consuming to "flash" the device with new firmware, which makes it impractical to frequently change a device's often based on different factors or conditions.

BRIEF SUMMARY

An apparatus for dynamically loading firmware based on geographic location is disclosed. A method and computer program product also perform the functions of the apparatus. In one embodiment, an apparatus includes a location module that determines a geographic location associated with a system. In a further embodiment, an apparatus includes a firmware module that determines a firmware configuration associated with a geographic location. In some embodiments, an apparatus includes a loading module that dynamically accesses a firmware configuration associated with a geographic location from a remote data store, and loads the firmware configuration on a system.

In one embodiment, a remote data store is one of a plurality of remote data stores where each remote data store is associated with a geographic location and stores firmware configurations intended for systems located at the geographic location. An apparatus, in some embodiments, includes an association module that associates one or more firmware configurations with a combination of a geographic location and one or more systems.

In certain embodiments, a location module determines a geographic location for a system after the system is booted, but before a firmware configuration is loaded on the system. In some embodiments, a firmware configuration determined for a system located in a geographic location is different than a firmware configuration determined for the system located in a different geographic location.

In certain embodiments, a system is configured with a system configuration corresponding to a geographic location and the firmware module further determines a firmware configuration for the system based on the system configuration for the geographic location where the system is located. In some embodiments, a system is configured according to one or more regulations associated with a geographic location such as network regulations, environmental regulations, power regulations, data security regulations, and user access regulations.

In certain embodiments, a firmware module further determines one or more characteristics of an infrastructure of a geographic location and determines a firmware configuration based on the one or more infrastructure characteristics. In some embodiments, the geographic location associated with a system is determined from one or more of a system setting, a location service, a time zone, an internet protocol ("IP") address, and a network latency between the system and a remote data store.

In some embodiments, the loading module does not access a firmware configuration associated with a geographic location from a remote data store in response to a firmware module determining that the firmware configuration associated with the geographic location is currently loaded on a system.

In one embodiment, the loading module updates one or more firmware pointers on a system that point to one or more storage locations for the firmware configuration on a remote data store. In some embodiments, a firmware configuration comprises one or more files configured for a geographic location. In some embodiments, one or more files of a firmware configuration includes device drivers, system settings, localization settings, access settings, and/or application settings.

A method, in one embodiment, includes determining, by use of a processor, a geographic location associated with a system. In some embodiments, a method includes determining a firmware configuration associated with a geographic location. In a further embodiment, a method includes dynamically accessing a firmware configuration associated with a geographic location from a remote data store, and loading a firmware configuration on a system.

In one embodiment, a remote data store is one of a plurality of remote data stores where each remote data store is associated with a geographic location and stores firmware configurations intended for systems located at the geographic location. In certain embodiments, a method includes associating one or more firmware configurations with a combination of a geographic location and one or more systems.

In certain embodiments, a firmware configuration determined for a system located in a geographic location is different than a firmware configuration determined for the system located in a different geographic location. In a further embodiment, a system is configured with a system configuration corresponding to a geographic location and a firmware configuration for the system is determined based on the system configuration for the geographic location where the system is located.

In some embodiments, a system is configured according to one or more regulations associated with a geographic location, which may include network regulations, environmental regulations, power regulations, data security regulations, and/or user access regulations. In various embodiments, a method includes determining one or more characteristics of an infrastructure of the geographic location such that a firmware configuration is determined based on the one or more infrastructure characteristics.

A program product, in one embodiment, includes a computer readable storage medium that stores code executable by a processor. In some embodiments, the executable code includes code to perform determining a geographic location associated with a system. In various embodiments, the executable code includes code to perform determining a firmware configuration associated with a geographic location. In a further embodiment, the executable code includes code to perform dynamically accessing a firmware configuration associated with a geographic location from a remote data store, and loading the firmware configuration on a system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
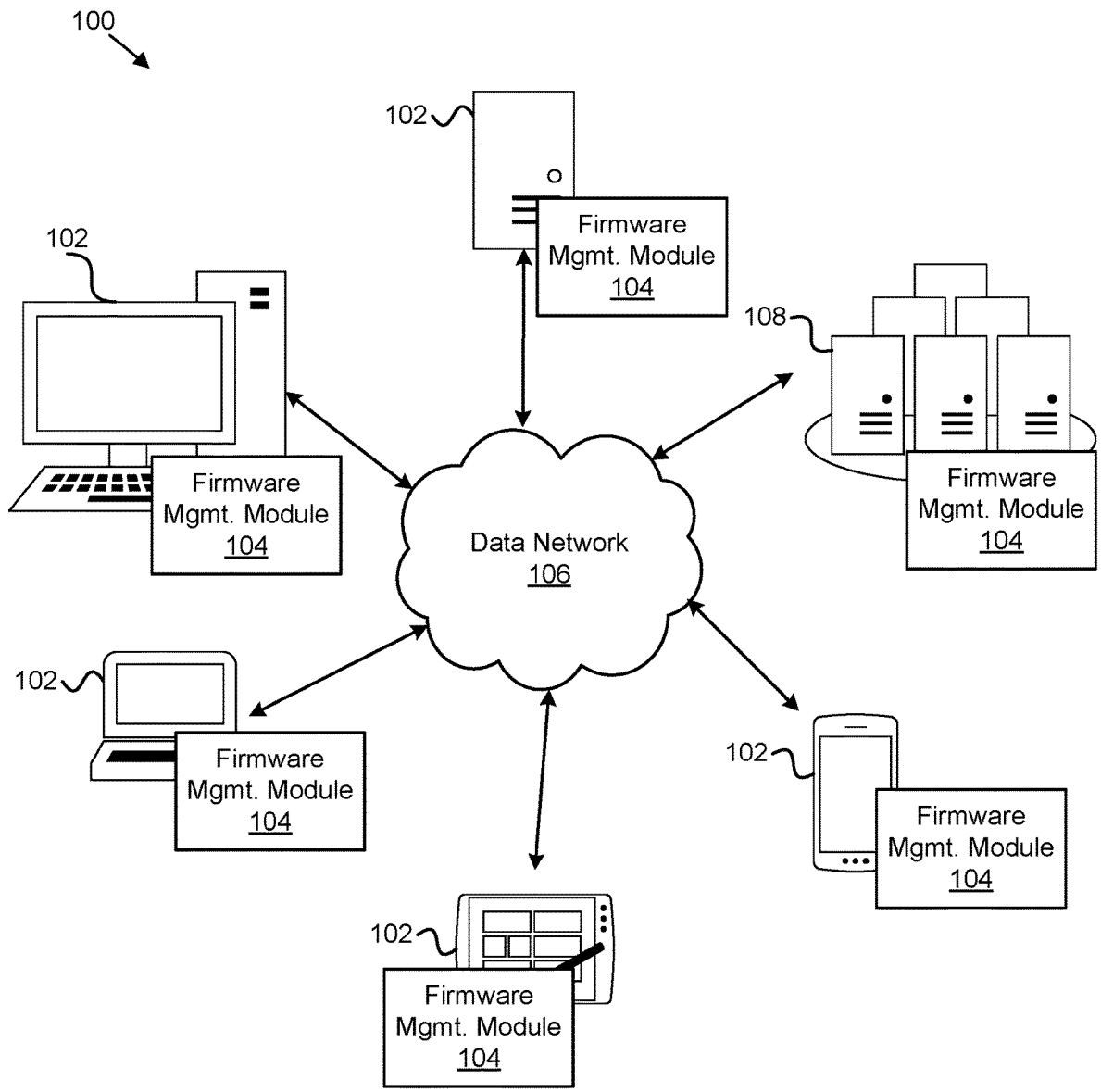
FIG. 1 is a schematic block diagram illustrating one embodiment of a system for dynamically loading firmware based on geographic location.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for dynamically loading firmware based on geographic location. In one embodiment, the system 100 includes one or more information handling devices 102, one or more firmware management modules 104, one or more data networks 106, and one or more servers 108. In certain embodiments, even though a specific number of information handling devices 102, firmware management modules 104, data networks 106, and servers 108 are depicted in FIG. 1, one of skill in the art will recognize, in light of this disclosure, that any number of information handling devices 102, firmware management modules 104, data networks 106, and servers 108 may be included in the system 100.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. As used herein, an information handling device 102 may also be known as a client device.

In certain embodiments, the information handling devices 102 are communicatively coupleable to one another and/or one or more servers 108 over a data network 106, described below. The information handling devices 102, in a further embodiment, are capable of executing various firmware, programs, program code, applications, instructions, functions, and/or the like, and may access, store, download, upload, and/or the like data located on one or more servers

108. In some embodiments, the information handling devices 102 are configured to locate, find, access, load, install and/or the like firmware for one or more components coupled to, integrated with, or otherwise operably connected to an information handling device 102, as described in more detail below.

In one embodiment, the firmware management module 104 is configured to dynamically access and load a firmware configuration on a system based on a geographic location. In some embodiments, the firmware management module 104 is configured to determine a geographic location associated with a system. In a further embodiment, the firmware management module 104 is configured to determine a firmware configuration associated with the geographic location. In various embodiments, the firmware management module 104 is configured to dynamically access the firmware configuration associated with the geographic location from a remote data store. In some embodiments, the firmware management module 104 is configured to load the remotely accessed firmware configuration on a system. In certain embodiments, at least a portion of the firmware management module 104 is located on an information handling device 102, a server 108, another device connected to the network 106, and/or a combination of the foregoing. In this manner, firmware configurations on a system may be dynamically changed on-the-fly without storing different versions of firmware locally and without flashing hardware with new firmware.

In various embodiments, the firmware management module 104 may be embodied as a hardware appliance that can be installed or deployed on an information handling device 102, on a server 108, or elsewhere on the data network 106. In certain embodiments, a firmware management module 104 may include a hardware device such as a secure hardware dongle or other hardware appliance device (e.g., a set-top box, a network appliance, or the like) that attaches to a device, a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the firmware management module 104 may include a power interface, a wired and/or wireless network interface, a graphical interface that attaches to a display, and/or a semiconductor integrated circuit device as described below, configured to perform the functions described herein with regard to the firmware management module 104.

The firmware management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the firmware management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the firmware management module 104.

The semiconductor integrated circuit device or other hardware appliance of the firmware management module 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the firmware management module 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In certain embodiments, the one or more servers 108 store files associated with different firmware configurations, such as device drivers, configuration files, localization files, and/or the like, which may be accessed and loaded by the firmware management module 104. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
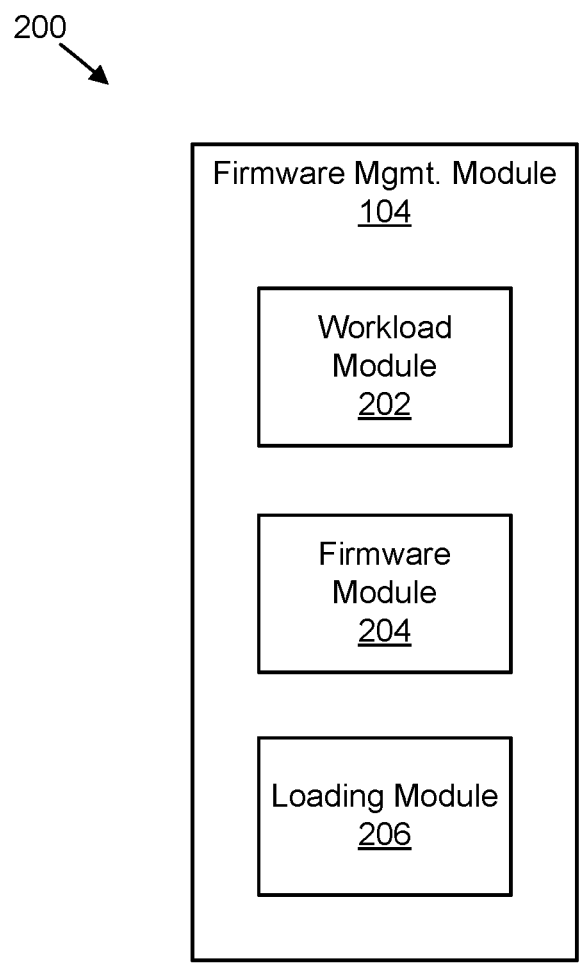
FIG. 2 is a schematic block diagram illustrating one embodiment of an apparatus for dynamically loading firmware based on workloads.

FIG. 2 depicts one embodiment of an apparatus 200 for dynamically loading firmware based on workloads. The apparatus 200 may include an embodiment of a firmware management module 104. In one embodiment, the firmware management module 104 includes a workload module 202, a firmware module 204, and a loading module 206, which are described in more detail below.

In one embodiment, the workload module 202 determines a workload configured to be executed on a system. The system, as used herein, may include an information handling device 102, a server 108, a datacenter, a virtual machine, and/or the like. Furthermore, as used herein, a workload configured to execute on the system may include an amount of work or tasks to be performed by the system, e.g., by one or more processors of the system, at a given time. The workload may include tasks associated with application programs executing on the system, one or more users connected to and interacting with the system, network transmissions, graphics processing, database processing, and/or the like.

The tasks of a workload may be configured beforehand so that a workload, including the tasks, applications, devices, and/or the like that are used to execute the workload, may be identifiable, measurable, and schedulable. For example, a workload may include a benchmarking workload where a number of predetermined computer programs, or other operations, are executed to assess the relative performance of the system to compare to previous test/benchmark results. Another example of a workload may be a web server workload that includes a number of network transmissions, database queries, data processing, and/or the like.

In one embodiment, the workload module 202 determines a workload to be executed on the system according to a predetermined schedule, described below with reference to the schedule module 304. For example, a workload may be scheduled to execute on a particular day/time, scheduled relative to another workload (e.g., after a previous workload is done executing), and/or the like. In a further embodiment, the workload module 202 determines a workload to be executed on the system based on a lifecycle state of the system, described below with reference to the lifecycle module 306. For example, a workload may be preconfigured for different lifecycle states of the system, such as a normal operating state, a testing state, a repair state, a maintenance state, and/or the like.

In one embodiment, the firmware module 204 is configured to determine a firmware configuration associated with a workload to be executed on the system. As used herein, a firmware configuration may include one or more firmware files that include device drivers (e.g., drivers for various devices, different versions of the same driver, and/or the like) and other low-level instructions for a specific device, system configuration settings, system localization settings, user access settings, network settings, device specific settings (e.g., network card settings, power supply settings, hard drive settings, or the like), and/or the like.

In one embodiment, a firmware configuration includes one or more firmware files configured for a system and/or a workload. For example, a firmware configuration may include device drivers for different devices/hardware used in a system (e.g., a hard drive, a solid state drive, RAM, a network interface card, a graphics card, a processor, and/or the like) and configuration settings associated with the devices/hardware, with one or more applications executing on the system, and/or the like. In other words, a firmware configuration may include a "best recipe" for a particular system configuration, including drivers and settings for the various hardware devices/components and software applications used in the system.

In one embodiment, a firmware configuration for a system and/or a workload may be stored in a remote data store, such as a cloud server 108 accessible over the Internet, a remote server 108 on a local network, e.g., an organization's intranet, a remote server 108 accessible over a virtual private network ("VPN"), a remote virtual server 108, and/or the like.

In one embodiment, the remote data store contains a plurality of preconfigured firmware configurations for various system configurations, various workloads, and/or the like. In one embodiment, instead of downloading and storing a firmware configuration on a system, which may require flashing hardware in the system to load the firmware configuration, the firmware module 204 determines a firmware configuration for the system and/or the workload that is stored on a remote data store and can be dynamically linked to, pointed to, referenced, or the like from the system and loaded on the system from the remote data store. In such an embodiment, the firmware module 204 may also determine a location on the remote data store where the firmware module 204 is located such as one or more address locations in volatile and/or nonvolatile memory.

In one embodiment, the firmware module 204 determines an identifier for a system and/or a workload, and uses the identifier to determine a firmware configuration for the system and/or workload. In one embodiment, an identifier for a system may include a model number, e.g., a model/serial number for the entire system, a model/serial number for a hardware/software component of the system, and/or the like. In some embodiments, a workload may have a workload identifier assigned to it.

The firmware module 204, in one embodiment, uses the system identifier and/or the workload identifier to determine a firmware configuration for the system and/or the workload. For example, the firmware module 204 may use a combination of a system identifier and a workload identifier as a key into a lookup table to determine a firmware configuration, which may also be identified by an identifier, for the system and/or the workload.

In one embodiment, the loading module 206 is configured to dynamically access a firmware configuration determined by the firmware module 204 to be associated with a system and/or a workload. The loading module 206 may access the determined firmware configuration from a remote data store, e.g. a remote server that stores a plurality of firmware configurations, as described above. The loading module 206 may access the remote data store over a network such as the Internet, an intranet, or the like, and may securely access the remote data store using a VPN or other data encryption method.

In one embodiment, the loading module 206 receives from the firmware module 204 an indicator, identifier, and/or the like for the determined firmware configuration. The firmware module 204 may also provide the loading module 206 with a parameter indicating the network location for the remote data store that the determined firmware configuration is stored on, such as an IP address, a server name, and/or other identifier. In some embodiments, the firmware module 204 provides an address, such as a memory or storage address, for the location of the determined firmware configuration on the remote data store.

In some embodiments, the loading module 206 provides login credentials, such as a username and password combination, a passphrase, an access code, or the like, to the remote data store in order to gain access to the firmware configuration. In some embodiments, the credentials provide the loading module 206 access to an entire firmware configuration library stored on the remote data store. In certain embodiments, the credentials provide the loading module 206 access to only the firmware configuration determined by the firmware module 204.

In one embodiment, the loading module 206 updates one or more pointers, e.g., data objects that reference a location of the firmware configuration (e.g., the locations of one or more drivers, configuration files, settings files, and/or the like) on the remote data store such as a memory address, to point to one or more locations on the remote data store where the determined firmware configuration is stored. As described herein, because firmware configuration files may not be stored locally on the system, a firmware configuration for the system may be dynamically switched by updating which firmware configuration the pointers point to on the remote data store. In such an embodiment, the firmware configuration may be remotely executed on the remote data store, or a different network device, instead of locally on the system, similar to a network boot process, loading of shared libraries, or the like.

In one embodiment, the loading module 206 downloads and stores locally at least a portion of the firmware configuration files. The loading module 206, for example, may download one or more firmware configuration files and store the firmware configuration files in volatile memory, e.g., RAM, so that when the system is rebooted, the downloaded configuration files are deleted. In this manner, no local copies of different firmware configurations are persistently stored on the system, which may prevent conflicts from arising on the system between different firmware configuration versions, settings, and/or the like being loaded at the same time.

In one embodiment, an operating system, a local firmware program, and/or the like may update the pointers as determined by the loading module 206. In some embodiments, the loading module 206, after updating the pointers to point to a firmware configuration on the remote data store, reboots the system. Upon a reboot of the system, in one embodiment, the loading module 206 checks the pointers to determine where the new firmware configuration is located on the remote data store, accesses the new firmware configuration, and loads the new firmware configuration on the system.

In such an embodiment, after a system is rebooted, for example, a local firmware program may dynamically load the firmware configuration files from the remote data store using the address locations referenced by the pointers. If a new workload is scheduled to execute on the system, and/or if a configuration of the system is changed (e.g., a new hard drive is installed in the system) the firmware module 204 may determine a new firmware configuration for the new workload and/or the new system configuration, and the loading module 206 may update the pointers to reference one or more addresses for the new firmware location on the remote data store such that when the system is rebooted, the local firmware program will load the new firmware configuration using the address locations referenced by the pointers. In this manner, the firmware configuration of a system may be changed on-the-fly without requiring re-flashing hardware with new firmware.

In some embodiments, the loading module 206 determines whether the determined firmware configuration is currently loaded on the system, and, if so, does not update the pointers, reboot the system, and/or connect to the data store to re-access the firmware configuration.

Figure 3:
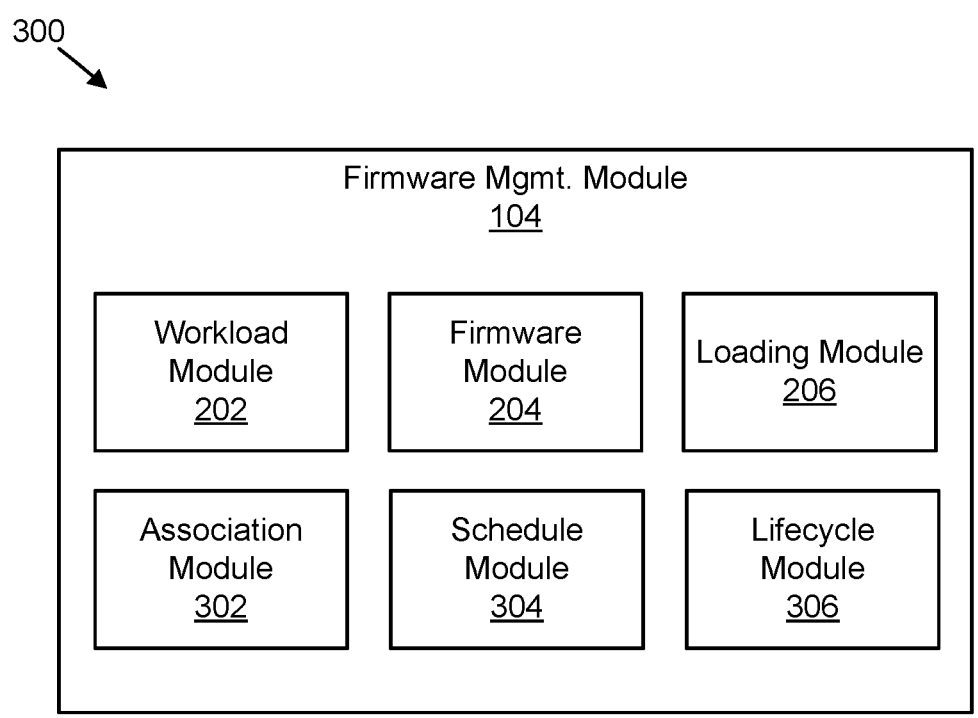
FIG. 3 is a schematic block diagram illustrating one embodiment of another apparatus for dynamically loading firmware based on workloads.

FIG. 3 depicts one embodiment of an apparatus 300 for dynamically loading firmware based on workloads. In one embodiment, the apparatus 300 includes an embodiment of a firmware management module 104. The firmware management module 104, in one embodiment, includes one or more of a workload module 202, a firmware module 204, and a loading module 206, which may be substantially similar to the workload module 202, the firmware module 204, and the loading module 206 described above with reference to FIG. 2. The firmware management module 104 may also include one or more of an association module 302, a scheduling module 304, and a lifecycle module 306, which are described in more detail below.

In one embodiment, the association module 302 is configured to associate one or more firmware configurations with a system and/or a workload. The association module 302, for example, may assign a firmware configuration to a system model number, or other system identifier and/or a workload identifier. As described above, a firmware configuration may include one or more device drivers, configuration files, settings files, and/or the like. Thus, the association module 302 may associate a system and/or a workload with one or more device drivers, configuration files, settings files, and/or the like, that make up a predefined firmware configuration and are stored on the remote data store or at a location connected to the remote data store such as a cloud server, network server, and/or the like.

In one embodiment, the association module 302 maintains a table, a list, an index, and/or the like on the remote data store that includes associations of firmware configurations to systems and/or workloads. For example, the association module 302 may maintain a table of key-value pairs, where the key is a system identifier, a workload identifier, a combination of the foregoing, a hash value based on the foregoing, or the like, and the value is an identifier for the firmware configuration.

In certain embodiments, the association module 302 receives input from a user, such as a system administrator, who manually defines the associations between a firmware configuration and a system and/or a workload. In a further embodiment, the association module 302 may determine one or more characteristics of the system and/or the workload, and select a firmware configuration that has one or more characteristics corresponding to the one or more characteristics of the system and/or the workload. For example, if a workload includes operations for performing a plurality of database queries and network transmissions, the association module 302 may associate with the workload a firmware configuration that is configured to optimize how a network interface functions and how a database management system performs.

In one embodiment, the schedule module 304 determines a workload schedule for a workload that is configured to be executed on the system. In some embodiments, as described above, prior to executing a workload, the firmware module 204 determines whether the system's currently loaded firmware is configured for the workload. If not, the firmware nodule 204 determines a firmware configuration on the remote data store that is associated with the workload, and the loading module 206 accesses and loads the firmware configuration prior to the workload being executed. Thus, the schedule module 304 may determine when the workload will be executed or is scheduled to be executed so that the correct firmware configuration for the workload can be loaded.

The schedule module 304, in some embodiments, checks a workload schedule maintained by an operating system, or other program, to determine when a workload will be executed. In one embodiment, the workload schedule specifies a specific time for executing a workload. For example, a workload that includes database maintenance tasks may be scheduled to execute in the middle of the night when the number of users connected to database, and, consequently, the number of database queries, is low. In some embodiments, the workload schedule indicates a workload execution order so that the schedule module 304 can determine when a workload will execute relative to another workload. The schedule module 304, in one embodiment, notifies the workload module 202 after determining which workload is ready to execute on the system.

The lifecycle module 306, in one embodiment, is configured to determine a lifecycle state for the system. The lifecycle state, as used herein, is a description of where the system is in its lifecycle, e.g., how the system is currently being used. Different lifecycle states may include a normal operating state, a testing state, a repair state, a maintenance state, and/or the like. As described above, the firmware module 204 may use the system's lifecycle state to determine a firmware configuration for the system.

For example, if the lifecycle module 306 determines that the system is in a testing state, the firmware module 204 may determine a firmware configuration for the system that includes device drivers in an alpha/beta development state, new system configurations, and/or the like so that the firmware configuration files, and/or other application programs, can be tested for bugs, usability, and/or other defects. Similarly, if the lifecycle module 306 determines that the system is in a repair state, the firmware module 204 may determine a firmware configuration for the system that includes drivers, files, or the like that are configured to be executed in a safe mode, a repair mode, or the like, which may include disabling network devices, disabling certain services, and/or the like. Thus, the firmware module 204 may select a firmware configuration to be loaded on the system according to how the system is being used at a given point in time.

Figure 4:
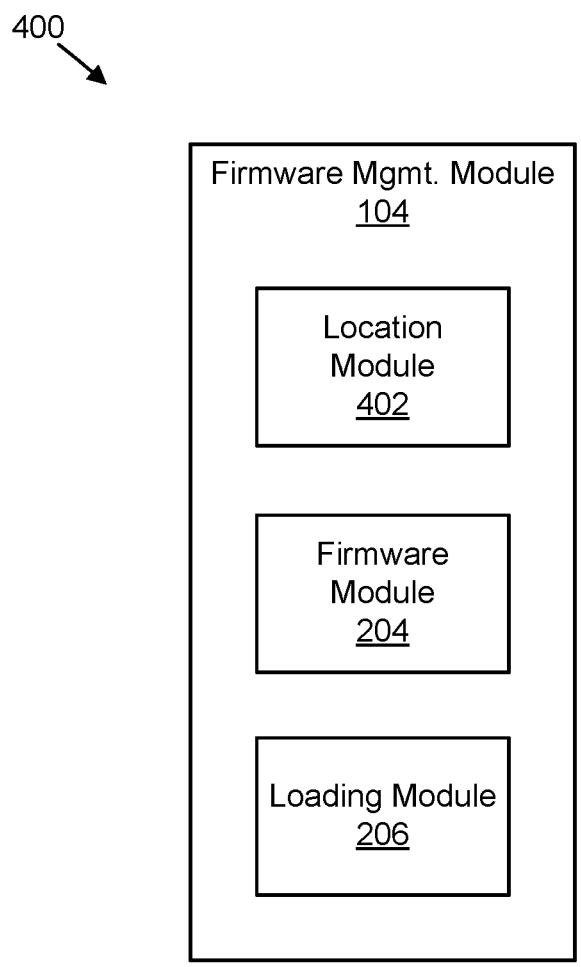
FIG. 4 is a schematic block diagram illustrating one embodiment of an apparatus for dynamically loading firmware based on geographic location.

FIG. 4 depicts one embodiment of an apparatus 400 for dynamically loading firmware based on a geographic location. The apparatus 400 may include an embodiment of a firmware management module 104. In one embodiment, the firmware management module 104 includes a location module 402, a firmware module 204, and a loading module 206. The firmware module 204 and the loading module 206 depicted in FIG. 4 may be substantially similar to the firmware module 204 and the loading module 206 described above with reference to FIGS. 2 and 3.

In one embodiment, the location module 402 is configured to determine a geographic location associated with a system. A geographic location, in one embodiment, may include a physical location where the system is located, a location of an internet service provider ("ISP") for the system, a principle place of business for an organization associated with the system, and/or the like. The geographic location may be a local area, such as a city, a township, a village, and/or the like; a regional area such as a county, a state, a province, and/or the like; a larger geographic region such as a country, a continent, a hemisphere, and/or the like; or any other predefined geographic location.

In one embodiment, the location module 402 determines a geographic location for a system based on one or more factors, parameters, settings, and/or the like. For example, a system may have a location setting that indicates the geographic location of the system. In such an embodiment, the location setting may be set and stored on the system by a system administrator, a manufacturer, an installer, and/or the like. In another example embodiment, the geographic location may be determined from a location service associated with the system. For example, the location module 402 may receive location data from one or more location sensors (e.g., global positioning system ("GPS") sensors) operably coupled to the system.

In one embodiment, the location module 402 determines the geographic location of the system using Wi-Fi triangulation (e.g., using a plurality of access points in communication with the system to locate the system), cell tower triangulation (e.g., using a plurality of cellular towers in communication with the system to locate the system), or any other triangulation method. In a further embodiment, the location module 402 determines the geographic location of the system based on a time-zone setting for the system, one or more localization settings for the system that may indicate a particular region, country, or the like, and/or the like.

In a further embodiment, the location module 402 determines the geographic location of the system using an IP address, or other network address, for the system that indicates the location of the system. In one embodiment, the location module 402 determines the geographic location of the system by determining a network latency, a number of hops between the system and a known device (e.g., a number of devices between the system and a known server), and/or the like. For example, the location module 402 may determine that the system is located in California because it is 150 hops away from a remote data store located in Colorado.

In one embodiment, the location module 402 determines the geographic location for the system after the system is booted, but before a firmware configuration is loaded on the system. In one embodiment, the firmware module 204 may determine, before a firmware configuration is loaded, whether a current firmware configuration loaded on the system is configured for the determined location, and if not, may determine a different firmware configuration configured for the determined geographic location to load on the system from a remote data store.

In certain embodiments, the firmware module 204 is further configured to determine a firmware configuration associated with a geographic location of the system. In some embodiments, a firmware configuration includes one or more firmware files configured for a system and/or a geographic location. For example, as described above, a firmware configuration may include device drivers for different devices/hardware used in a system (e.g., a hard drive, a solid state drive, RAM, a network interface card, a graphics card, a processor, and/or the like) and configuration settings, e.g., localization settings for the geographic location, associated with the devices/hardware, with one or more applications executing on the system, and/or the like.

As described above, a firmware configuration for a system and/or a geographic location may be stored in a remote data store. In one embodiment, the remote data store contains a plurality of preconfigured firmware configurations for various system configurations, various geographic locations, and/or the like. In one embodiment, instead of downloading and storing a firmware configuration on a system, which may require flashing hardware in the system to load the firmware configuration, the firmware module 204 determines a firmware configuration for the system and/or the geographic location that is stored on a remote data store and can be dynamically linked to, pointed to, referenced, or the like from the system and loaded on the system from the remote data store. In such an embodiment, the firmware module 204 may also determine a location on the remote data store where the firmware module 204 is located such as one or more address locations in volatile and/or nonvolatile memory.

As described above, a plurality of remote data stores that store firmware configurations are maintained and located at various geographic locations, and may be accessed according to the geographic location of the system as determined by the location module 402. In certain embodiments, a remote data store located in a particular geographic location stores firmware configurations configured for systems located in the same geographic location as the remote data store. Thus, a remote data store may be selected according to the geographic location of the system as determined by the location module 402. For example, a remote data store located in Denver, Colo. may provide firmware configurations for systems located in the western United States region, while a remote data store located in Atlanta, Ga. may provide firmware configurations for systems located in the southeastern United States region.

In some embodiments, a system is configured with one or more default IP addresses for remote data stores that include firmware configurations for the system. In some embodiments, the firmware module 204 updates the IP addresses for the remote data stores based on the geographic location determined by the location module 402. For example, the firmware module 204 may determine that a remote data store is located within a closer proximity to the system than a current default remote data store, and will update the default IP address to be the IP address for the remote data store that is closer to the system's geographic location.

In some embodiments, a firmware configuration for a system located in one geographic location is different than a firmware configuration for the same system located in a different geographic location. For example, the firmware module 204 may determine a firmware configuration for a system installed in a data center in Tokyo, Japan. The firmware configuration may include firmware files and settings specifically intended for Tokyo. The same system, however, may be installed in a data center in London, England, and the firmware module 204 may determine a different firmware configuration for the system that includes firmware files and settings specifically configured for London. In this manner, the same system can be configured using different firmware configurations that are configured for a particular geographic location without requiring reinstallation of firmware (e.g., flashing hardware with new firmware) by pointing to or referencing the firmware configuration on the remote data store for a particular geographic region.

In one embodiment, the firmware module 204 determines a firmware configuration for a system based on a configuration of the system. In some embodiments, the system configuration is based on one or more rules, laws, regulations, or the like of a geographic location where the system is located. In certain embodiments, a system may be configured according to network regulations, environmental regulations, power regulations, data security regulations, user access regulations, and/or the like of the geographic area where the system is located. For example, the firmware module 204 may determine a firmware configuration for a system that is located in China such that the system complies with network regulations (e.g., filtering Internet traffic at the network interface to comply with censorship regulations) established by the Chinese government. Accordingly, a firmware configuration may be predefined to comply with various regulations of different geographic regions.

In one embodiment, the firmware module 204 determines one or more characteristics of an infrastructure of the geographic location where the system is located to determine a firmware configuration for the system. The one or more infrastructure characteristics may include power stability of the area, Internet connectivity and bandwidth of the area, various costs and fees of operating the system in the area (e.g., power costs, Internet communication costs, etc.), and/or the like. The firmware module 204 may access a government database, or other data source, to determine the various infrastructure characteristics of an area, and determine an appropriate firmware configuration for the system. For example, if the system is installed in a location that has sporadic Internet connectivity and an inconsistent power source, the firmware module 204 may determine a firmware configuration that includes files and settings configured to handle inconsistent network connectivity and power shortages.

As described above, the firmware module 204, in some embodiments, uses an identifier, such as a system identifier, to determine or locate a firmware configuration for the system stored on a remote data store. In such an embodiment, the firmware module 204 may use a system identifier and/or a location code for the geographic location (e.g., a ZIP code, an area code, or the like) as input into a hash function to generate a hash value that identifies the firmware configuration for the system and/or the geographic location.

In one embodiment, as described above, the loading module 206 is configured to dynamically access a firmware configuration determined by the firmware module 204 to be associated with a system and/or a geographic location. The loading module 206 may access the determined firmware configuration from a remote data store, e.g. a remote server that stores a plurality of firmware configurations, as described above, based on the geographic location of the system.

Furthermore, as discussed above, an operating system, a local firmware program, and/or the like may update one or more pointers to point to a firmware configuration on the remote data store and reboots the system. Upon a reboot of the system, in one embodiment, the loading module 206 checks the pointers to determine where the new firmware configuration is located on the remote data store, accesses the new firmware configuration, and loads the new firmware configuration on the system.

In such an embodiment, after a system is rebooted, for example, a local firmware program may dynamically load the firmware configuration files from the remote data store using the address locations referenced by the pointers. If the system is moved to a new geographic location, for example, and/or if a configuration of the system is changed (e.g., a new hard drive is installed in the system) the firmware module 204 may determine a new firmware configuration for the new geographic location and/or the new system configuration, and the loading module 206 may update the pointers to reference one or more addresses for the new firmware location on the remote data store such that when the system is rebooted, the local firmware program will load the new firmware configuration using the address locations referenced by the pointers. In this manner, the firmware configuration of a system may be changed on-the-fly without requiring re-flashing hardware with new firmware.

Figure 5:
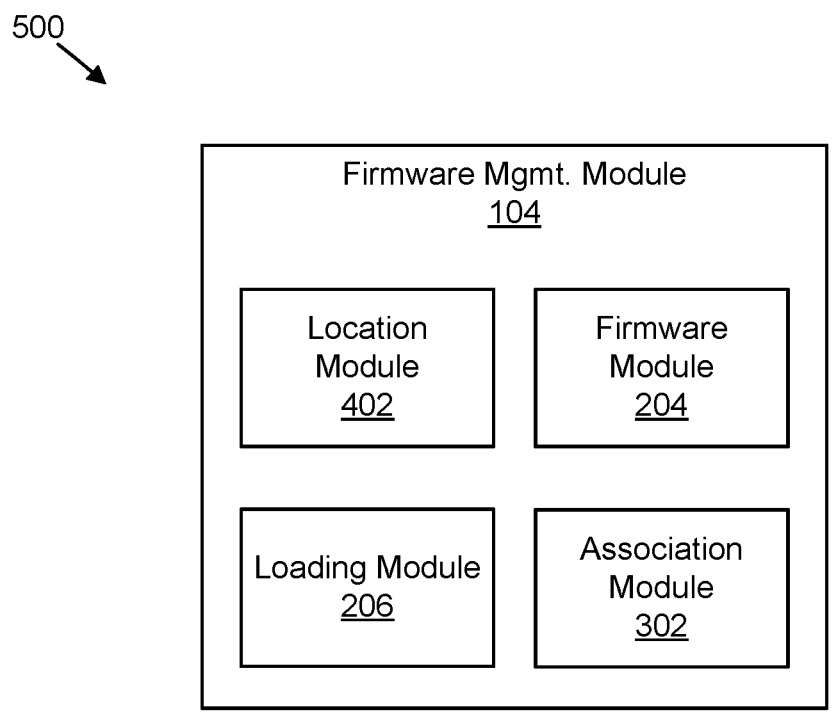
FIG. 5 is a schematic block diagram illustrating one embodiment of another apparatus for dynamically loading firmware based on geographic location.

FIG. 5 depicts one embodiment of an apparatus 500 for dynamically loading firmware based on a geographic location. In one embodiment, the apparatus 500 includes an embodiment of a firmware management module 104. The firmware management module 104, in one embodiment, includes one or more of a location module 402, a firmware module 204, and a loading module 206, which may be substantially similar to the location module 402, the firmware module 204, and the loading module 206 described above with reference to FIGS. 2-4. The firmware management module 104 may also include an association module 302, which may be substantially similar to the association module 302 described above with reference to FIG. 3.

In one embodiment, the association module 302 is configured to associate one or more firmware configurations with a system and/or a geographic location. The association module 302, for example, may assign a firmware configuration to a system model number, or other system identifier and/or a geographic location identifier. As described above, a firmware configuration may include one or more device drivers, configuration files, settings files, and/or the like. Thus, the association module 302 may associate a system and/or a geographic location with one or more device drivers, configuration files, settings files, and/or the like, that make up a predefined firmware configuration and are stored on the remote data store or at a location connected to the remote data store such as a cloud server, network server, and/or the like.

In one embodiment, as described above, the association module 302 maintains a table, a list, an index, and/or the like on the remote data store that includes associations of firmware configurations to systems and/or geographic locations. For example, the association module 302 may maintain a table of key-value pairs, where the key is a system identifier a geographic location identifier, a combination of the foregoing, a hash value based on the foregoing, or the like, and the value is an identifier for the firmware configuration.

In certain embodiments, the association module 302 receives input from a user, such as a system administrator, who manually defines the associations between a firmware configuration and a system and/or a geographic location. In a further embodiment, the association module 302 may determine one or more characteristics of the system and/or the geographic location, and select a firmware configuration that has one or more characteristics corresponding to the one or more characteristics of the system and/or the geographic location. For example, if a system is located in Germany, the association module 302 may associate a firmware configuration that includes localization settings specific for Germany such as language settings.

Figure 6:
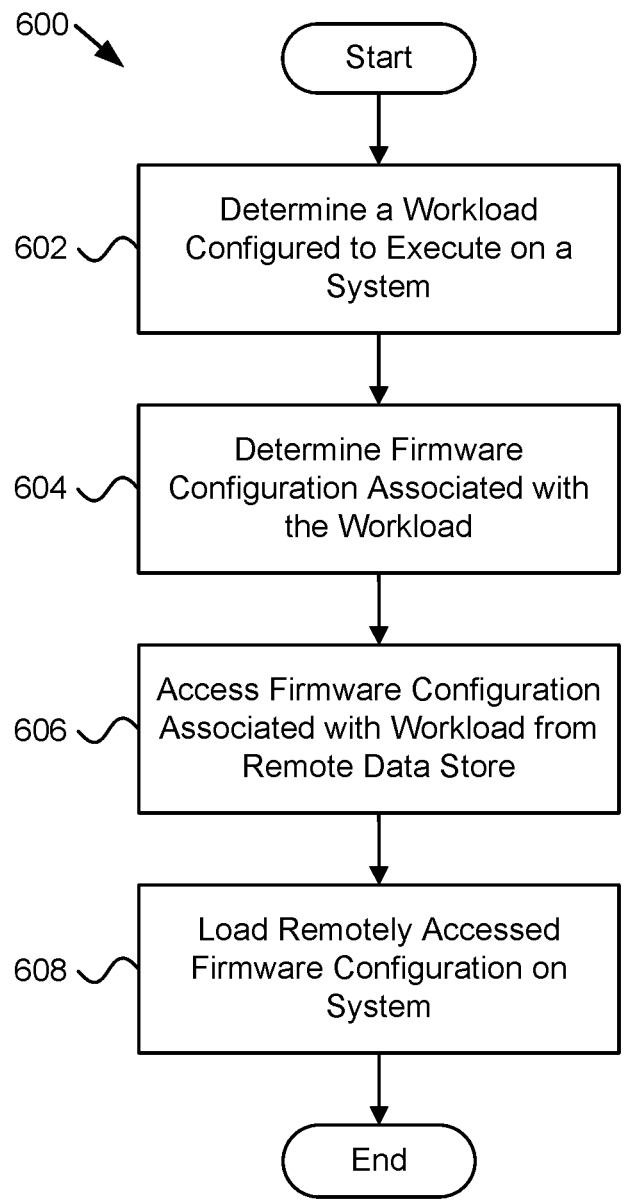
FIG. 6 is a schematic flow chart diagram illustrating one embodiment of a method for dynamically loading firmware based on workloads.

FIG. 6 depicts one embodiment of a method 600 for dynamically loading firmware based on workloads. In one embodiment, the method 600 begins and determines 602 a workload configured to execute on a system. In a further embodiment, the method 600 determines 604 a firmware configuration associated with the workload. In some embodiments, the method 600 dynamically accesses 606 a firmware configuration associated with the workload from a remote data store. In one embodiment, the method 600 loads 608 the remotely accessed firmware configuration, and the method 600 ends. In some embodiments, the workload module 202, the firmware module 204, and the loading module 206 perform one or more functions of the method 600.

Figure 7:
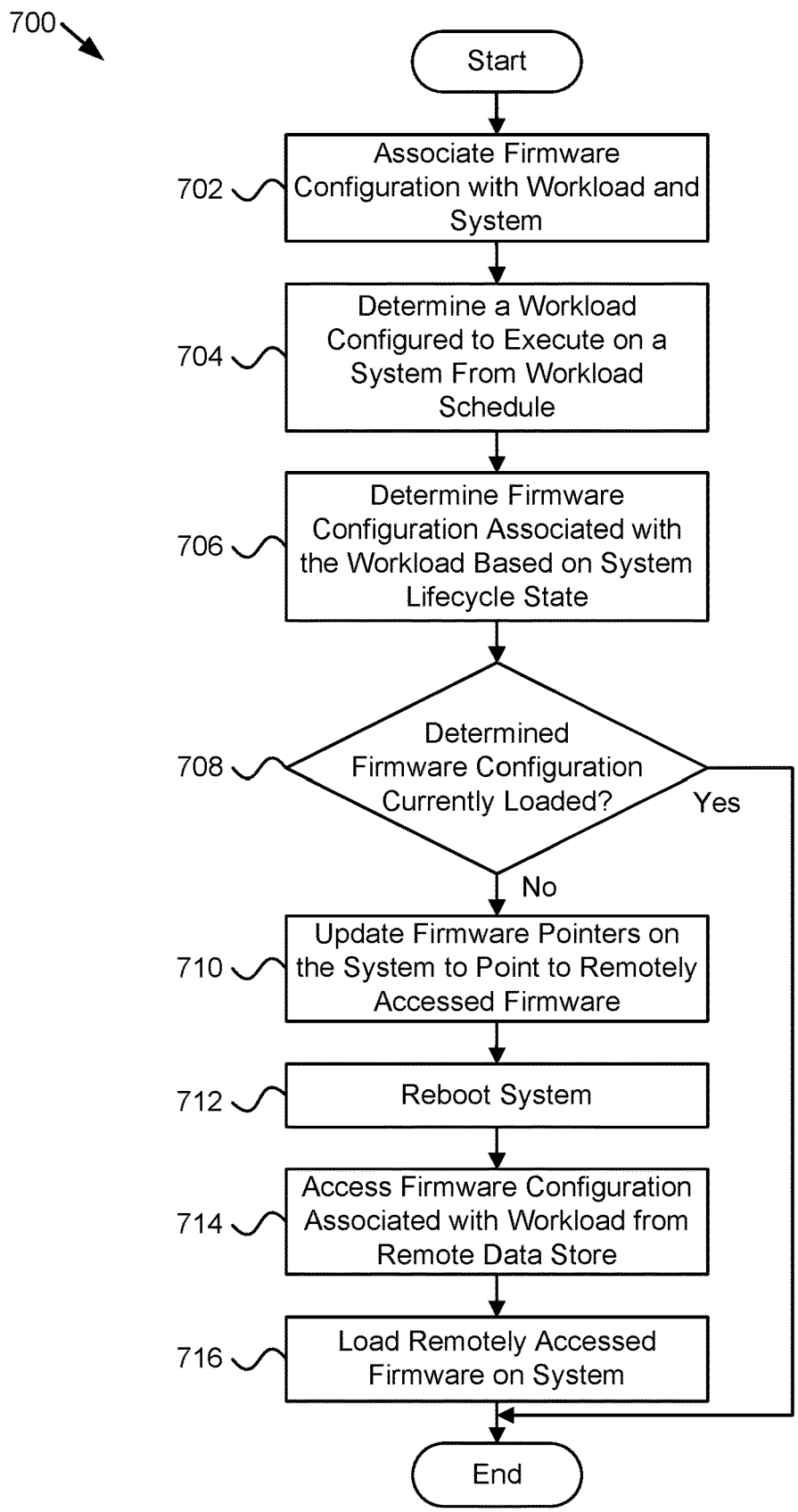
FIG. 7 is a schematic flow chart diagram illustrating one embodiment of another method for dynamically loading firmware based on workloads.

FIG. 7 depicts one embodiment of another method 700 for dynamically loading firmware based on workloads. In one embodiment, the method 700 begins and associates 702 a firmware configuration with a workload and/or a system. In a further embodiment, the method 700 determines 704 a workload configured to execute on a system according to a workload schedule for the system. In one embodiment, the method 700 determines 706 a firmware configuration for the workload according to a lifecycle state for the system.

In one embodiment, if the method 700 determines 708 that the firmware configuration associated with the workload is already loaded on the system, the method 700 ends. Otherwise, in certain embodiments, the method 700 updates 710 one or more firmware pointers on the system to point to one or more locations on a remote data store where the firmware configuration files are located. The method 700, in some embodiments, reboots 712 the system and accesses 714 the location of the firmware configuration on the remote data store using the firmware pointers.

In various embodiments, the firmware configuration files are downloaded from the remote data store to a memory location on the system, such as RAM, a cache, or the like. In a further embodiment, the firmware configuration files are remotely executed over the network on the remote data store, or another server. The method 700, in one embodiment, loads 716 the remotely accessed firmware on the system, and the method 700 ends. In some embodiments, the workload module 202, the firmware module 204, the loading module 206, the association module 302, the schedule module 304, and the lifecycle module 306, perform one or more functions of the method 700.

Figure 8:
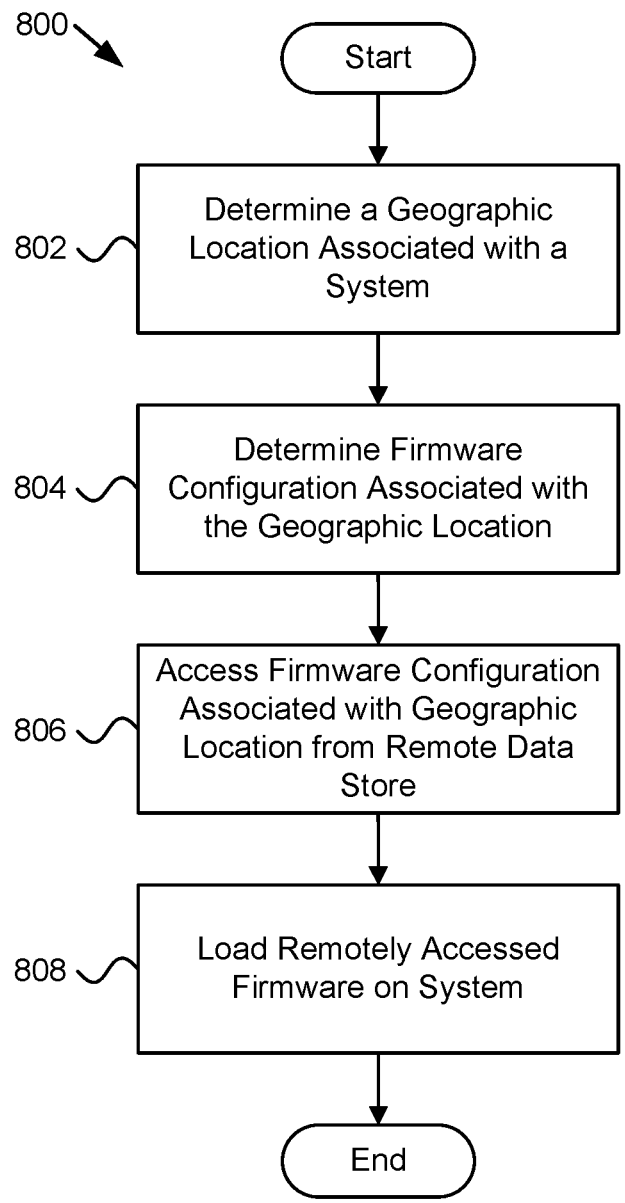
FIG. 8 is a schematic flow chart diagram illustrating one embodiment of a method for dynamically loading firmware based on geographic location.

FIG. 8 depicts one embodiment of a method 800 for dynamically loading firmware based on a geographic location. In one embodiment, the method 800 begins and determines 802 a geographic location associated with a system. In a further embodiment, the method 800 determines 804 a firmware configuration associated with the geographic location. In some embodiments, the method 800 dynamically accesses 806 a firmware configuration associated with the geographic location from a remote data store. In one embodiment, the method 800 loads 808 the remotely accessed firmware configuration, and the method 800 ends. In some embodiments, the location module 402, the firmware module 204, and the loading module 206 perform one or more functions of the method 800.

Figure 9:
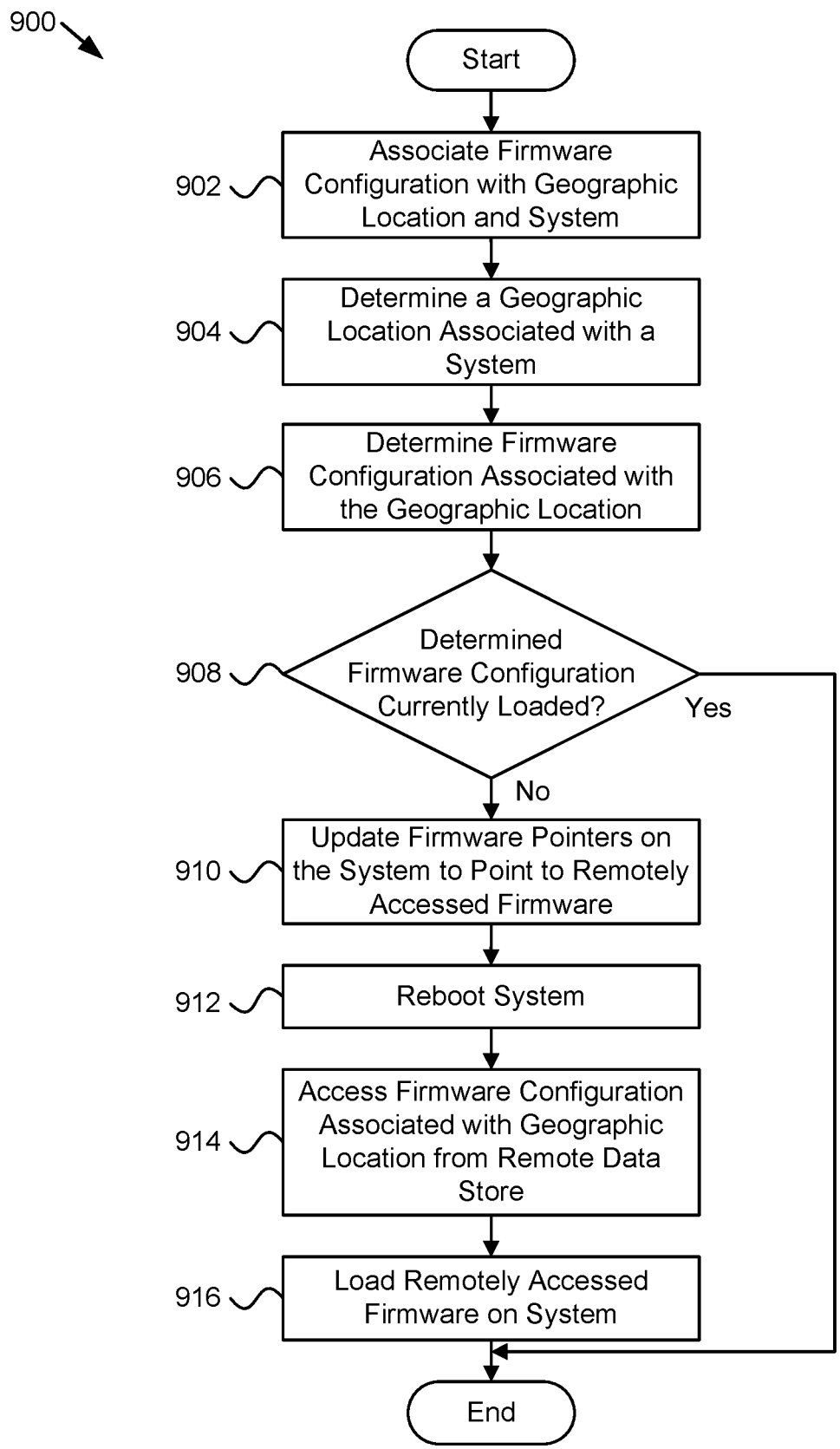
FIG. 9 is a schematic flow chart diagram illustrating one embodiment of another method for dynamically loading firmware based on geographic location.

FIG. 9 depicts one embodiment of another method 900 for dynamically loading firmware based on a geographic location. In one embodiment, the method 900 begins and associates 902 a firmware configuration with a geographic location and/or a system. In a further embodiment, the method 900 determines 904 a geographic location associated with a system. In one embodiment, the method 900 determines 906 a firmware configuration for the geographic location.

In one embodiment, if the method 900 determines 980 that the firmware configuration associated with the geographic location is already loaded on the system, the method 900 ends. Otherwise, in certain embodiments, the method 900 updates 910 one or more firmware pointers on the system to point to one or more locations on a remote data store where the firmware configuration files are located. The method 900, in some embodiments, reboots 912 the system and accesses 914 the location of the firmware configuration on the remote data store using the firmware pointers.

In various embodiments, the firmware configuration files are downloaded from the remote data store to a memory location on the system, such as RAM, a cache, or the like. In a further embodiment, the firmware configuration files are remotely executed over the network on the remote data store, or another server. The method 900, in one embodiment, loads 916 the remotely accessed firmware on the system, and the method 900 ends. In some embodiments, the location module 402, the firmware module 204, the loading module 206, and the association module 302 perform one or more functions of the method 900.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a location module that determines a geographic location of a computing device comprising a volatile memory device, the computing device not comprising a firmware configuration that is persistently stored in a non-volatile storage device, wherein the computing device and volatile memory device are located at the determined geographic location;
- a firmware module that determines a firmware configuration associated with the determined geographic location, wherein a local copy of a firmware configuration associated with the determined geographic location is not stored in persistent storage of the computing device; and
- a loading module that:
  - updates one or more firmware pointers on the computing device to point to one or more storage locations for the firmware configuration on a remote data store;
  - reboots the computing device in response to updating the one or more firmware pointers;
  - in response to the reboot, dynamically accesses the firmware configuration associated with the geographic location from a remote data store based on the one or more firmware pointers to the one or more storage locations;
  - loads the firmware configuration on the volatile memory device of the computing device; and
  - automatically deletes the firmware configuration from the volatile memory device in response to a reboot of the computing device to prevent the computing device from persistently storing a local copy of the firmware configuration in non-volatile storage,
- wherein said modules comprise hardware circuits, a programmable hardware device and/or executable code executing on a processor.

2. The apparatus of claim 1, wherein the remote data store is one of a plurality of remote data stores, each remote data store being associated with a geographic location and storing firmware configurations intended for computing devices located at the geographic location.

3. The apparatus of claim 1, further comprising an association module that associates one or more firmware configurations with a combination of a geographic location and one or more computing devices.

4. The apparatus of claim 1, wherein the location module determines the geographic location for the computing device after the computing device is booted, but before a firmware configuration stored on the computing device is loaded.

5. The apparatus of claim 1, wherein a firmware configuration determined for the computing device located in the geographic location is different than a firmware configuration determined for the computing device located in a different geographic location.

6. The apparatus of claim 1, wherein the computing device is configured with a computing device configuration corresponding to the geographic location, the firmware module further determining the firmware configuration for the computing device based on the computing device configuration for the geographic location where the computing device is located.

7. The apparatus of claim 1, wherein the computing device is configured according to one or more regulations associated with the geographic location, the one or more regulations comprising one or more of network regulations, environmental regulations, power regulations, data security regulations, and user access regulations.

8. The apparatus of claim 1, wherein the firmware module further determines one or more characteristics of an infrastructure of the geographic location, the firmware module determining the firmware configuration based on the one or more infrastructure characteristics.

9. The apparatus of claim 1, wherein the geographic location associated with the computing device is determined from one or more of a computing device setting, a location service, a time zone, an internet protocol ("IP") address, and a network latency between the computing device and the remote data store.

10. The apparatus of claim 1, wherein the loading module does not access the firmware configuration associated with the geographic location from the remote data store in response to the firmware module determining that the firmware configuration associated with the geographic location is currently loaded on the computing device.

11. The apparatus of claim 1, wherein the firmware configuration comprises one or more files configured for the geographic location, the one or more files comprising one or more of device drivers, computing device settings, localization settings, access settings, and application settings.

12. A method comprising:
- determining, by use of a processor, a geographic location of a computing device comprising a volatile memory device, the computing device not comprising a firmware configuration that is persistently stored in a non-volatile storage device, the processor and volatile memory device are located at the determined geographic location;
- determining a firmware configuration associated with the determined geographic location, wherein a local copy of a firmware configuration associated with the determined geographic location is not stored in persistent storage of the computing device;
- updating one or more firmware pointers on the computing device to point to one or more storage locations for the firmware configuration on a remote data store;
- rebooting the computing device in response to updating the one or more firmware pointers;
- in response to the reboot, dynamically accessing the firmware configuration associated with the geographic location from a remote data store based on the one or more firmware pointers to the one or more storage locations;
- loading the firmware configuration on the volatile memory device of the computing device; and
- automatically deleting the firmware configuration from the volatile memory device in response to a reboot of the computing device to prevent the computing device from persistently storing a local copy of the firmware configuration in non-volatile storage.

13. The method of claim 12, wherein the remote data store is one of a plurality of remote data stores, each remote data store being associated with a geographic location and storing firmware configurations intended for computing devices located at the geographic location.

14. The method of claim 12, further comprising associating one or more firmware configurations with a combination of a geographic location and one or more computing devices.

15. The method of claim 12, wherein a firmware configuration determined for the computing device located in the geographic location is different than a firmware configuration determined for the computing device located in a different geographic location.

16. The method of claim 12, wherein the computing device is configured with a computing device configuration corresponding to the geographic location, the firmware configuration for the computing device being determined based on the computing device configuration for the geographic location where the computing device is located.

17. The method of claim 16, wherein the computing device is configured according to one or more regulations associated with the geographic location, the one or more regulations comprising one or more of network regulations, environmental regulations, power regulations, data security regulations, and user access regulations.

18. The method of claim 12, further comprising determining one or more characteristics of an infrastructure of the geographic location, the firmware configuration being determined based on the one or more infrastructure characteristics.

19. A program product comprising a non-transitory computer readable storage medium that stores code executable by a processor, the executable code comprising code to perform:
   determining a geographic location of a computing device comprising a volatile memory device, the computing device not comprising a firmware configuration that is persistently stored in a non-volatile storage device, volatile memory device are located at the determined geographic location;
   determining a firmware configuration associated with the determined geographic location, wherein a local copy of a firmware configuration associated with the determined geographic location is not stored in persistent storage of the computing device; and
   updating one or more firmware pointers on the computing device to point to one or more storage locations for the firmware configuration on a remote data store;
   rebooting the computing device in response to updating the one or more firmware pointers;
   in response to the reboot, dynamically accessing the firmware configuration associated with the geographic location from a remote data store based on the one or more firmware pointers to the one or more storage locations;
   loading the firmware configuration on the volatile memory device of the computing device; and
   automatically deleting the firmware configuration from the volatile memory device in response to a reboot of the computing device to prevent the computing device from persistently storing a local copy of the firmware configuration in non-volatile storage.

* * * * *